United States Patent [19]

Saverio

[11] Patent Number: 4,581,197
[45] Date of Patent: Apr. 8, 1986

[54] FISSION GAS PRESSURE MEASURING INSTRUMENT AND METHOD

[75] Inventor: Granata Saverio, Pisa, Italy

[73] Assignee: Agip Nucleare, S.p.A., Rome, Italy

[21] Appl. No.: 411,846

[22] Filed: Aug. 26, 1982

[30] Foreign Application Priority Data

Sep. 1, 1981 [IT]  Italy .............................. 23705 A/81

[51] Int. Cl.$^4$ ................................................ G21C 17/00
[52] U.S. Cl. .................................... 376/247; 376/253; 376/310
[58] Field of Search ............... 376/245, 253, 310, 451, 376/247; 29/400 N

[56] References Cited

U.S. PATENT DOCUMENTS 4,309,250  1/1982  Bradley .............................. 376/310
4,420,455  12/1983  Qurnell et al. ....................... 376/258
4,428,903  1/1984  Kasik et al. .......................... 376/253

Primary Examiner—Salvatore Cangialosi
Attorney, Agent, or Firm—Hedman, Gibson, Costigan & Hoare

[57] ABSTRACT

A device is disclosed for applying a head fitted with a measuring instrument to a nuclear fuel bar, the device comprising a casing containing a drilling tip and means for stopping the drilling tip as a bore has been formed through the bar plug and an instrument, such as a pressure gauge for measuring the pressure of the released fission gases, or another instrument adapted to measure a parameter of interest.

A method for applying a head containing a measuring instrument to a nuclear fuel bar is also described.

15 Claims, 1 Drawing Figure

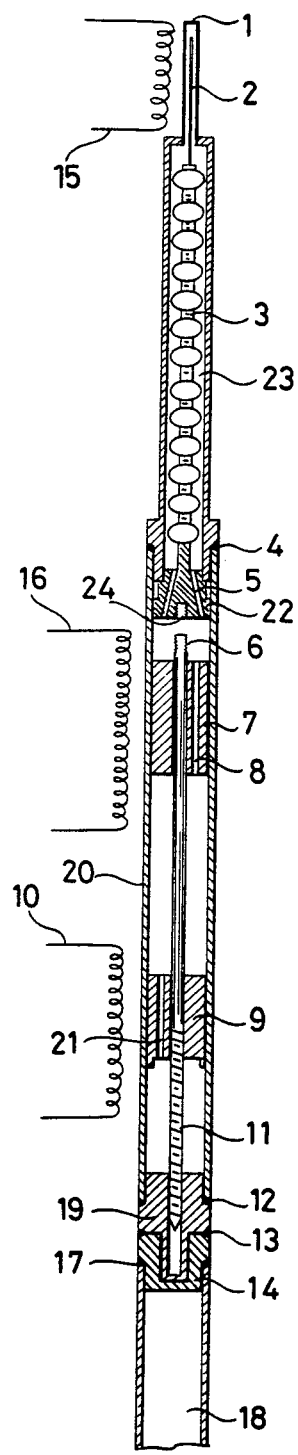

FISSION GAS PRESSURE MEASURING INSTRUMENT AND METHOD

This invention relates to a measuring head which is adapted to the determination of the fission gas pressure released in the interior of bars of nuclear fuel which are not equipped with instruments and which have attained a high irradiation rating and to the method for applying instruments to said bars with the aid of said head.

It is known in the art that it is possible to equip with instruments the nuclear fuel bars in order to determine, in the reactors being tested, the behaviour towards irradiation, that is, the variation of the critical parameters as a function of time.

Such instruments, according to the conventional art, are inserted in the new bars during manufacture, that is, before the bars are installed in a test reactor and then irradiated.

It is of utmost interest, on the other hand, to know the conditions of the fuel in the interior of bars which had not been previously equipped with a measuring instrument (and which have attained a high degree of irradiation) coming both from research reactors (so as to be able to carry out further, less expensive and more accurate investigations) and from power reactors (so as to be able to know the actual conditions at a certain instant of time, especially after irregular operation or accidents).

There is thus the problem of fitting with an appropriate measuring instrument said particular fuel bars (that is those which had not previously been fitted with instruments) after they have been subjected to irradiation either in a test reactor or in a power-producing reactor, and this is exactly the main objective of the present invention.

A known approach for equipping with measuring instrument bars which have already worked for a certain time in a reactor consists in overhauling, either partially or totally, in a hot cell, said fuel bars once that they have been withdrawn from the reactors in which they have been irradiated and, subsequently, reassembling them completely, still operating in a hot cell, but equipping them additionally with an appropriate instrument (principally instruments for measuring the pressure of the fission gases). This known approach obviously involves the drawback that the entire bar is to be reassembled completely and this at a cost which greatly exceeds the manufacturing costs of a new bar and, moreover, the conditions of the fuel and the fission gases in the interior of the reassembled bar are, on completion of the operation, entirely different from the starting ones so that they cannot any longer represent the state of the old fuel.

The measuring head, according to the present invention, conversely permits to dispense with opening the nuclear fuel bar during the stage of application of the instrument (thus preventing the leakage of radioactive gases from the interior of the bar towards the outside environment, which is not of negligible importance from the point of view of the operational safety) thus without appreciably disturbing the state of the gas and the fuel in the interior of the bar concerned.

The measuring head according to the present invention is composed of two principal portions, a bottom section containing the drilling means and a top section containing a pressure gauge and forming, together, an elongate hermetically sealed metal casing closed at both ends. Said casing, still hermetically sealed, is welded to either end of the fuel bar and, once the welding has been completed and inspected, it becomes possible to carry out the drilling of the measuring head and the bar by the tools contained in the interior of the bottom section of the measuring head, thus enabling the fission gas to flow from the bar to the measuring head, wherein a specially provided instruments previously arranged in the top section of the head makes possible to measure such pressure.

More particularly, the measuring head in question is equipped in its interior (in the bottom section) with an appropriate drilling tip and with self-contained means which permits the rotation and/or the forward motion thereof (the axial displacement for carrying out the simultaneous drilling of both the bottom of the measuring head and the plug of the bar) as well as with a stopping system which permits, once drilling has been completed, to stop the drilling tip at such a position as to leave the bore free as it has been drilled. Still internally, but in the top section of the head, a special instrument is installed which measures (and transmits to a remote location) the variation of pressure due to the inflow of the fission gases coming from the fuel bar. The means which make possible the rotation and/or the forward motion preferably consist of an iron cylinder and/or a magnetic dipole integral with the drilling tip, driven by one or two electromagnetic fields.

With reference to the diagram in the accompanying drawing, the measuring head is composed of the cylindrical metallic casing 20 having a diameter equal (but not compulsorily so) to the diameter of the plug 14 of the bar 18 to be fitted with an instrument and with a possible diameter reduction in the top section.

The lower portion of the measuring head is composed of a metallic plug 19 welded at the point 12 to the casing 20, and having optionally a cylindrical projection to be inserted in the recess which has been previously provided through the bar plug 14, in order to obtain a satisfactory positioning and centering. The metal plug of the measuring head 19 is internally drilled (blind hole) and this hole is a guideway for the drilling tip 11 while being rotated and fed forward.

To the drilling tip 11 and to the interior of the metal casing 20 there is rigidly connected a soft iron cylinder and/or a magnetic dipole 9 having the central bore housing the drill tip and a diameter which is slightly smaller than the inside diameter of the casing. The soft iron and/or magnetic dipole permit to effect (due to the motive force of the electromagnetic field 10) both the axial and the rotary motions of the drill tip and the necessary pressure for the drilling action. The cylinder and/or the dipole are appropriately bored at 21 to permit the flow of the fission gases therethrough. On the top section of the drill tip 11, there is solidly affixed another cylinder 7 which is a magnetic dipole which, by the motive action of the electromagnetic field 16 enables the tip 11 to be rotated axially, thus obtaining the necessary drilling action. Also said second cylinder, 7, is bored at 8 to allow the flow of fission gases therethrough. The top end section of the tip is appropriately screw-threaded at 6 and together with the combined actions of the electromagnetic fields 10 and 16 is the system for blocking the drilling tip once the drilling step is over, the tip being screwed in the female tap 24 formed in the top plug 22.

The drilling system, according to the present invention, can be selected from among those of the vibratory type, the rotary type, the expansion type, the percussion type or combinations of these and also of the percussion type with the sealed metallic bellows acted upon from the outside.

The top portion of the measuring head is the sealtight enclosure which houses the pressure gauge 3. The cylinder 23 is welded to the cylinder 20 at the spot 4. The pressure gauge consists, preferentially, of a thin, axially resilient metallic bellows, 3, closed at both of its ends. Either end is integral with the plug 22, the latter being also bored to allow the gases to flow therethrough whereas the other end is freely movable. To the latter end there is secured a core 2, which is the movable section (like a ferroxcube) of a differential transformer 15. A very thin-walled tube 1 forming a tight seal with the cylinder 23 contains the core 2 and separates it from the electric section of the differential transformer. As the pressure in the interior of the cylinder 23 is increased, the metal bellows 3 is shortened and drags the core 2. This movement is detected just by the unbalance of the differential transformer which, upon an appropriate calibration, gives directly the magnitude of the pressure. The tube 1 has two discrete functions, viz.: the first function is to make the calibration of the differential transformer possible by introducing through the position 1 the gas having a known pressure, and the second function (once that calibration has been effected) is that of permitting to provide in the head interior a desired atmospherical environment (vacuum or any appropriate controlled atmosphere). Once that the desired conditions have been obtained, the tube 1 is hermetically sealed by spot welding its top section.

The diameters of the top and the bottom sections of the measuring head can be different from one another, along its height, consistently with the particular experimental conditions.

By way of a nonlimiting example, the accompanying drawing shows an embodiment of a preferential measuring head, which is comprised of a plug 19, a first snub casing 20 and the plug 22 with openings 5 which connect the head space housing the drilling system to the pressure-measuring chamber, a second tall casing 23 slipped into the former casing and welded thereto by a welding spot 4, said latter casing having a diameter shorter than that of the first-named casing. All the other reference numerals have the meanings which have been explained hereinbefore.

A characteristic feature of the measuring head according to the present invention is that it can be assembled, tested and calibrated in a cold laboratory, prior to welding it to the fuel bar. The test is made by introducing an inert gas, preferably helium, at the spot 1 of the drawing. There is thus a possibility of searching possible leakages with a mass spectrometer for helium so as to make sure of the sealtightness. Once that the measuring head has thus been constructed, tested and calibrated, the head in question is introduced in a special, authorized, hot cell in which the preselected irradiated (and thus extremely active) nuclear fuel bar has already been positioned, as coming from a test reactor or a power reactor as the case may be. Thus, the application proper of the measuring instrument to the bar can be proceeded with by the following sequence of steps:

(a) Introducing the nuclear fuel bar having a high irradiation rating into a hot cell;
(b) flattening either plug of the bar;
(c) drilling the blind centering hole through a preselected portion only of the bar plug;
(d) securing the bar to the measuring head;
(e) welding together the bar and the measuring head;
(f) providing one or more, particularly two, external electromagnetic fields so as to make the drilling operations possible, and preparing the instruments for measuring the pressure in the interior of the measuring head;
(g) simultaneously drilling the head bottom and the bar plug, and
(h) withdrawing the drilling tip and locking it so as to leave the drilled bore free.

According to the method of this invention, the simultaneous drilling of the head bottom wall and the bar plug takes place by rotation and forward motion of a drill tip as caused by externally applied electromagnetic fields. The axial advance of the drill tip can either be continuous or with a concurrent axial vibration.

According to a modification of the present invention, the simultaneous drilling of the head bottom wall and the bar plug takes place by rotation of the bar integrally with the plug, whereas an external magnetic field locks the drilling tip at a fixed position, the bore is made by combining the rotary motion with an axial advance motion of the bar.

The bar so equipped with a measuring instrument is now in readiness for being inserted anew in a testing reactor to be subjected either to a new irradiation stage, or to a power ramp. The assembling method according to the invention can be obtained with the head component parts in the reverse order or with a configuration other than described herein and shown in the drawing.

The measuring head according to the present invention can be used for nuclear fuel bars which have attained low, average and high irradiation ratings and coming from nuclear power reactors (BWR,PWR, quick reactors, CANDU and others), or from research nuclear reactors.

The measuring head as hereinbefore described, according to the present invention, can be fitted with a number of different measuring instruments such as extensimeters, displacement measuring instruments, and others.

The measuring head according to the present invention finds an application not only for measurements of fission gas release for research purposes, but also in the fuel surveillance plans and procedures as adopted for conducting the power reactors. By fuel surveillance all these procedures are intended which are applied during operation of a power station in the periods in which the station is off and which serve for an evaluation of the conditions of the fuel in connections with safety factors. In such a case, during the normal periodical off time of the power station (or immediately after an accident has occurred or the operation is irregular), it is possible to remove, together with the fuel surveillance elements, a segmented bar (purposely introduced in the reactor concerned) or a whole bar to which the measuring head in question can be applied. The bar with the measuring head applied thereto, not only gives immediately the value of the pressure of the gases as released in its interior, but can also be transferred into a specially provided reactor and subjected therein to a power ramp test so as to evaluate the magnitude of its probability of breakage and thus to get an indication of its capability of remaining unaffected in the case of an accident.

The technological steps described above can also be applied to chemical installations having a degree of hazard, such as those in which explosive and flammable gases are handled, or those in which toxic liquids are manipulated and like occurrences, in the case in which it is desired to insert during the operation of the installation either a new measuring instrument or an optional sampling cock, or whenever it is desired to know some parameter which had not been forecast in the design, or which is desirable to know in the case of malfunction of the installation.

I claim:

1. A method for measuring the pressure of released fission gases within a nuclear fuel bar having a high degree of irradiation comprising the steps of:
   (a) introducing the nuclear fuel bar having a high degree of irradiation into a hot cell;
   (b) flattening a sealing plug of the fuel bar;
   (c) drilling a blind centering hole through a preselected portion of the sealing plug;
   (d) securing the bar to an end of a pressure measuring device;
   (e) welding together the fuel bar and said pressure measuring device;
   (f) providing at least one external electromagnetic field to an electromagnetically driven drilling tip within said pressure measuring device so as to rotate and axially displace said tip;
   (g) simultaneously drilling the end of said device and the sealing plug of the fuel bar with said drilling tip;
   (h) withdrawing said drilling tip from the fuel bar and locking it in a raised position so as to leave the drilled bore in the fuel bar open to the pressure measuring device; and
   (i) measuring the pressure of the fission gases within said pressure measuring device.

2. The method according to claim 1, wherein the drilling tip can be fed either continuously or vibrationally in the axial direction.

3. A method according to claim 1, wherein the simultaneous drilling of the end of said device and the sealing plug of the bar takes place by rotation of said bar integral with the plug, whereby said external magnetic field locks the drilling tip at a fixed position, the bore in the fuel bar being formed by combining a rotary motion and an axial advance of the bar.

4. A method according to claim 3, wherein the axial advance of the bar can either be continuous or with a vibration in the axial direction.

5. A device for measuring the pressure of released fission gas within a nuclear fuel bar having a high degree of irradiation comprising:
   a casing having two sections, including:
   a bottom section having a lower end plug adapted to be positioned on the fuel bar, and a drilling tip centrally disposed therein,
   a top section having a sealed upper end and means for measuring parameters of the fission gas,
   a top plug between said bottom and top section, including at least one opening therethrough,
   means for rotating and axially displacing said drilling tip within said bottom section, and
   means for stopping and securing said drilling tip in a raised position at said top plug so that after drilling through said lower end plug and the fuel bar an open passageway is provided between the fuel bar and said parameter measuring means in said top section, whereupon the fission gas will flow through the drilled opening and up through said opening in said top plug and into said top section for measurement.

6. A device according to claim 5, wherein said means for rotating and axially displacing said drilling tip comprises at least one iron cylinder and magnetic dipole having a diameter less than the inside breadth of said bottom section and a central bore through which said drilling tip is rigidly affixed, said drilling being driven by the action of at least one external electromagnetic field on said magnetic dipole.

7. A device according to claim 5, wherein said lower end plug includes an external cylindrical projection for aligning said bottom section with a recess provided in a sealing plug on the nuclear fuel bar.

8. A device according to claim 7, wherein a recess in said lower end plug is drilled to provide a guideway for the advance of said drilling tip.

9. A device according to claim 5, wherein said means for rotating and axially displacing said drilling tip comprises a magnetic dipole intergal with said drilling tip, said tip being driven by at least one external electromagnetic field.

10. A device according to claim 5, wherein said top plug is provided with a threaded opening for receiving a threaded end section of said drilling tip so as to secure said drilling tip to said top plug.

11. A device according to claim 5, wherein said top plug includes a plurality of openings between said top and bottom sections.

12. A device according to claim 5, wherein said parameter measuring means is an instrument for measuring variations in the pressure of said fission gas comprising an axially resilient metal bellows closed at both top and bottom ends, the bottom end being integral with said top plug, the top end being freely moveable and having a core affixed thereto, said core being a moving section of a differential transformer.

13. A device according to claim 12, wherein said sealed upper end of said top section provides a tubular housing for said core affixed to said bellows so that calibration of a differential transformer is conducted by providing a controlled atmosphere within said top section of said device.

14. A device according to claim 5, wherein said parameter measuring means is an extensimeter.

15. A device according to claim 5, wherein said parameter measuring means is a displacement-measuring instrument.

* * * * *